Jan. 10, 1956  F. C. BORST  2,730,128
PIVOTED VALVE UNIT FOR OVERHEAD SPRINKLERS
Filed April 6, 1951
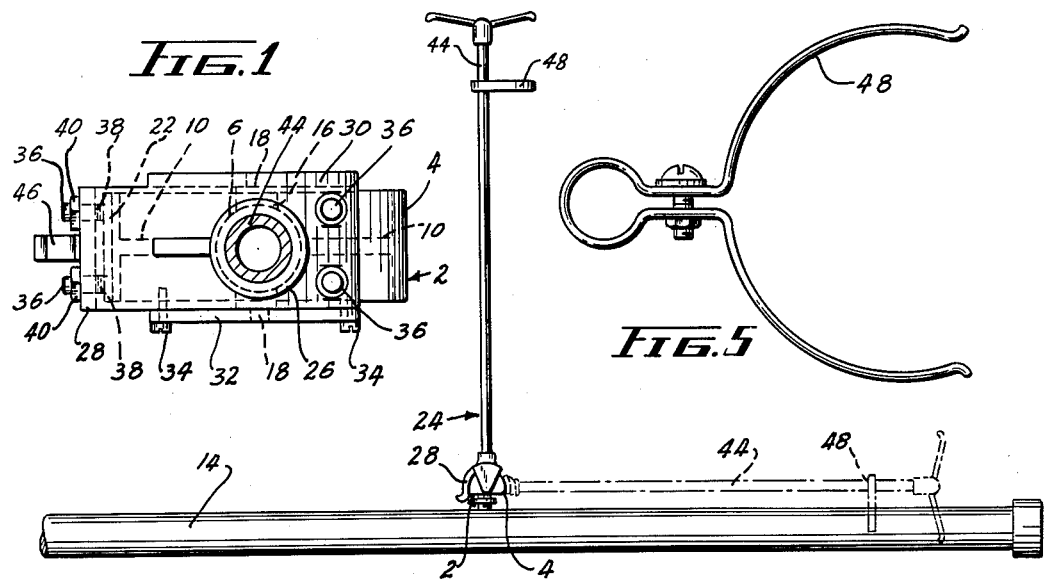
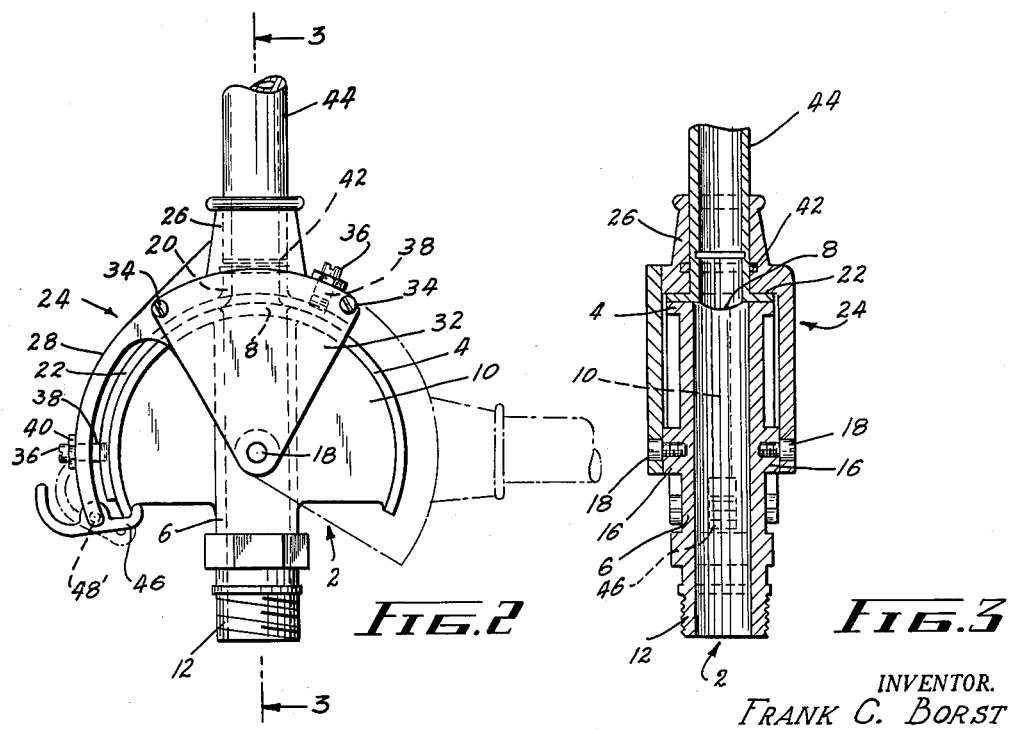
INVENTOR.
FRANK C. BORST
BY
ATTORNEY

United States Patent Office 2,730,128
Patented Jan. 10, 1956

2,730,128

PIVOTED VALVE UNIT FOR OVERHEAD SPRINKLERS

Frank C. Borst, Oroville, Wash.

Application April 6, 1951, Serial No. 219,731

1 Claim. (Cl. 137—616.7)

The present invention relates to improvements in sprinkler irrigating devices and, more specifically, to a new and improved hinged adaptor for overhead sprinklers.

Hitherto the sprinkler heads were carried by upright standpipes rigidly secured to pipelines by means of flanges or the like. This arrangement makes it very difficult to transport from place to place the pipeline sections which are twenty feet long and to which standpipes that are up to twelve feet high are secured.

Therefore, one object of the present invention is the provision of a device of the character described which permits each standpipe to move angularly from vertical position to a horizontal position without disconnecting it from the pipeline, thus allowing the sprinkler assembly to lay parallel to the base pipe line, so as to greatly facilitate the transporting of pipe line sections and reducing substantially the time and labor necessary for this work, as well as reducing to a minimum the space requirements for storing and shipping of assembled standpipes and pipeline sections.

Another object of the present invention is the provision of a device of the character described which automatically interrupts the flow of water from the pipe line through a stand pipe when the latter is moved from an upright position to an inclined position, or to a position in which it is parallel to the pipe line, thus permitting the making of repairs or replacements on any one sprinkler head or stand pipe individually without shutting off the entire sprinkler system on a pipe line.

A further object of the present invention is the provision of a device of the character described which is simple in construction, light in weight, and inexpensive to manufacture and to install but which is also sturdy, durable and well adapted for the purpose for which it is intended.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing a preferred form of the invention has been shown.

In said drawing:

Figure 1 is a top plan view of a preferred embodiment of my invention;

Figure 2 is a side elevation of the same;

Figure 3 is a sectional view on the line 3—3 of Figure 2;

Figure 4 is a reduced side view showing pipes and an embodiment of my invention; and, Figure 5 is a detailed plan view of a clamp.

Similar reference characters refer to similar parts throughout the several views.

In the drawing the numeral 2 denotes a sector-shaped member which has a rim 4, formed on the arcuate side of the sector of the member 2, and a tubular portion 6. The latter is rightangularly disposed to the rim 4 and extends vertically through the center of the rim 4 and terminates at a perforation 8 in the rim 4. The latter is reinforced by means of rib portions 10, which extend from both sides of the tubular portion 6. The lower end of the tubular portion 6 is provided with a thread 12 for screwing the device into a threaded hole in a pipe line section 14 (Figure 4) in the same manner as hitherto the ends of standpipes have been screwed directly into the pipe lines.

Hub portions 16 are extended from both sides of the tubular portion 6 and are axially disposed relative to the rim 4, and a pivot pin 18 is secured to each hub portion 16.

A flanged pipe 20 has at one end of its tubular portion a flange portion 22, whose inner side is curved at the same radius as the outer side of the rim 4. The flange portion 22 is slidable on the rim 4. While the rim 4 extends over a sector of a circle at about two hundred degrees, the flange portion 22 covers only about one half of the rim 4.

A sleeve member 24 has a tubular portion 26, a flange portion 28, and a lateral sector portion 30 whose pointed end is pivoted to the sector-shaped member 2 by means of one of the pins 18. The flange portion 28 is curved at a slightly larger radius than the flange portion 22 and is slidable upon the latter. A sector-shaped plate 32 is secured to the flange portion 28 opposite the portion 30 by means of screws 34 or the like, and its pointed end is pivoted to the sector-shaped member 2 by means of the other pin 18.

Adjustment screws 36 are screwed through the flange portion 28 at various points and any suitable resilient means, for instance a spring 38 is interposed between each screw 36 and the flange portion 22, so that the latter will always be pressed tightly upon the rim 4. The pressure of the flange portion 22 upon the rim 4 can be adjusted by manipulating the screws 36, and the latter can be retained after adjustment by tightening the lock nuts 40.

The upper end of the flanged pipe 20 extends slidably into the lower section of the tubular portion 26 of the sleeve member 24, and a packing ring 42 is provided therebetween. A sprinkler stand pipe 44 is extended into and secured to the upper and main sections of the tubular portion 26.

Any suitable locking means, for instance a locking catch 46 is pivoted at 48' (Figure 2) to the other, lower end of the flange portion 28, and is adapted for holding the parts 22, 24 and 44 in the position shown in full lines in Figures 2 and 4. In this position the opening of the pipe 44 registers with the flanged pipe 20 as well as with the perforation 8 and the tubular portion 6 of the sector-shaped member 2, so that water from the pipe line 14 can flow into the pipe 44. If the latter is moved in a clockwise direction from its vertical position to an inclined position or to a horizontal position, as is indicated in dash-and-dotted lines in Figures 2 and 4, the opening of the flanged pipe 20 no longer registers with the opening of the tubular portion 6, and the perforation 8 is closed by the flange portion 22, so that no water can flow from the pipe line 14 to the pipe 44. If the catch 46 is moved from its position shown in full lines in Figure 2 to the position indicated in dash-and-dotted lines, the parts 22, 24 and 44 can be moved around the pins 18.

In order to retain the pipe 44 in a horizontal position, during transportation or the like, I prefer to attach thereto a clamp 48 (Figures 4 and 9) whose resilient branches are adapted to engage firmly the pipe line 44.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which as a matter of language might be said to fall therebetween.

Having thus fully described my said invention, what I claim as new and desire to secure by Letters Patent in the United States is:

A pivoted valve unit for overhead sprinklers consisting of a sector-shaped member having a rim formed on the arcuate side thereof and provided with a perforation intermediate its ends and having a tubular portion extending through said member and terminating at said perforation, a flanged pipe having a tubular portion and a flange portion which is curved at a slightly larger radius than the rim of said sector-shaped member and is slidable thereupon, a sleeve member slidably mounted on the tubular portion of said flanged pipe and having a flange portion extending over the outer side of the flange of said flanged pipe in an arc of slightly greater radius than that of the flange, opposed lateral sector portions secured to said sleeve member and pivotally mounted on a pair of pins laterally extending from opposite sides of said sector-shaped member, a packing ring interposed between the tubular portion of said flanged pipe and that section of said sleeve member into which said last-mentioned tubular portion is extended, locking means provided at one end of the flange portion of said sleeve member being constructed and arranged for releasably engaging one end of the rim of said sector-shaped member, a set screw screwed through the flange portion of said sleeve member, and resilient means interposed between said set screw and said flanged pipe for forcing the flanged pipe against the circumference of the rim of said sector-shaped member, whereby upon release of the locking means said sleeve member may be pivoted to either an open position in which a fluid flow passage is established through the tubular portions and sleeve member or a closed position in which the pipe flange covers said perforation and arrests flow therethrough.

References Cited in the file of this patent

UNITED STATES PATENTS

| | | |
|---|---|---|
| 174,543 | Letzkus | Mar. 7, 1876 |
| 283,287 | Schoening | Aug. 14, 1883 |
| 405,277 | Scoville | June 18, 1889 |
| 937,541 | Oden | Oct. 19, 1909 |
| 980,392 | Anderson | Jan. 3, 1911 |
| 1,384,540 | Reeves | July 12, 1921 |
| 2,211,759 | Pitner | Aug. 20, 1940 |